United States Patent [19]

Rütschle et al.

[11] Patent Number: 4,850,764

[45] Date of Patent: Jul. 25, 1989

[54] MACHINE TOOL

[75] Inventors: Eugen Rütschle, Mühlheim; Hans-Henning Winkler, Tuttlingen, both of Fed. Rep. of Germany

[73] Assignee: Chiron-Werke GmbH & Co. KG, Tuttlingen, Fed. Rep. of Germany

[21] Appl. No.: 61,138

[22] Filed: Jun. 10, 1987

[30] Foreign Application Priority Data

Jun. 14, 1986 [DE] Fed. Rep. of Germany ....... 3620086

[51] Int. Cl.⁴ .............................................. B23Q 1/14
[52] U.S. Cl. .................................... 409/198; 269/57; 408/71; 409/222
[58] Field of Search ............... 409/174, 198, 221, 222, 409/223, 240, 134; 408/71, 127; 269/57; 74/613, 614; 192/132, 135

[56] References Cited

U.S. PATENT DOCUMENTS

| | | | |
|---|---|---|---|
| 2,107,578 | 2/1938 | Onsrud | 144/145 |
| 2,355,082 | 8/1944 | Kearney et al. | 90/20 |
| 2,668,557 | 2/1954 | Hoelscher | 138/61 |
| 3,170,375 | 2/1965 | Weidauer | 409/198 |
| 3,241,454 | 3/1966 | Medley | 90/13 |
| 3,592,095 | 7/1971 | Passa et al. | 269/57 X |
| 3,797,081 | 3/1974 | Buzzi | 29/38 C |
| 3,841,199 | 10/1974 | Jepson et al. | 408/71 X |

FOREIGN PATENT DOCUMENTS

| | | |
|---|---|---|
| 1107310 | 7/1952 | Fed. Rep. of Germany . |
| 2405024 | 2/1974 | Fed. Rep. of Germany . |
| 8316776 | 6/1983 | Fed. Rep. of Germany . |
| 1454405 | 12/1961 | France . |
| 57-127637 | 1/1981 | Japan . |
| 2040244 | 12/1979 | United Kingdom . |

Primary Examiner—Z. R. Bilinsky
Attorney, Agent, or Firm—Pretty, Schroeder, Brueggemann & Clark

[57] ABSTRACT

A machine tool comprises a spindle stock that can be moved along several axes. A work table can be rotated alternately in opposite directions by an angle of, preferably, 180° about an axis extending perpendicularly to the table surface in such a manner that the halves of the table surface form alternately, at any given time, a processing area located in the working area of the spindle stock and a mounting area located at a distance from the working area. At least one line leads from a stationary part of the machine tool to the work table for transmitting signals and/or supplying energy.

In order to simplify the arrangement of the line, in particular if a plurality of such lines is provided, the line is connected above the said work table to a point on the said stationary part of the said machine tool and, hanging down loosely between the two parts, on the other hand to a connection box of the said work table.

11 Claims, 3 Drawing Sheets

MACHINE TOOL

The present invention relates to a machine tool comprising a spindle stock that can be moved along several axes, a work table capable of being rotated alternately in opposite directions by an angle of, preferably, 180° about an axis extending perpendicularly to the table surface in such a manner that the halves of the table surface form alternately, at any given time, a processing area located in the working area of the spindle stock and a mounting area located at a distance from the working area, at least one line leading from a stationary part of the machine tool to the work table for transmitting signals and/or supplying energy. A machine tool of this type has been known before from German Utility Pat. No. 83 16 776.

With respect to machine tools it has been known on the one hand to design that part of the machine which carries the machining tool, for example the spindle stock, as a displaceable unit while on the other hand it has been also known to displace the table carrying the workpiece linearly or by rotation. This movement of the table may serve on the one hand to guide the workpiece past a stationary tool for being machined by the latter. In the case of numerically controlled machine tools, rotary tables are, however, also used to enable the next tool to be mounted on the one side of the table while the workpiece is being machined on the other side of the table so that processing of the next workpiece can begin immediately upon completion of the processing operation performed on the preceding workpiece, simply by rotating the table by, for example, 180°. During processing of the new workpiece, the preceding workpiece can then be removed, and the new workpiece to be processed can be mounted. Apart from the very efficient utilization of the total machining time available, this configuration of a rotary table provides the additional advantage that feeding of the workpiece to the tool is effected with particularly high precision because the simple rotary movement of the table by, for example, 180° can be implemented precisely and in a simple manner.

If workpieces are to be machined on a rotary table of the type described above, it is sometimes necessary to establish connections between the stationary part of the machine tool and the rotary table. These connections may, for example, serve to supply energy in the form of compressed-air or fluid from the machine tool to the rotary table or to exchange signals between the machine tool and the work table. Typically, this will be the case when the workpiece is chucked on the table by means of an independently operated work fixture or a dividing attachment. For operating the work fixture and the dividing attachment, energy is required which may be supplied, for example, in the form of electric current, compressed air or hydraulic fluid. In addition, such connections may be intended to transmit to the work table control signals for the controlled operation of the said attachments, or to transmit signals from limit switches, sensors, or the like, which may be arranged on the attachments, from the work table back to the machine tool. Finally, connection lines of this type may be used, for example, for exerting an overpressure inside the attachments located on the work table in order to prevent any entry of dirt, drilling coolant, chips, or the like. Finally, these lines may also be used for supplying drilling coolant for cooling the workpiece being machined.

From the before-mentioned German Utility Pat. No. 83 16 776 it has been known to provide a connection between the stationary part of the machine tool and the rotary table by guiding at least one electric line and/or fluid line from below the table through the table to its upside along a path extending concentrically with the rotary axis of the rotary table. A suitable coupling arranged to rotate together with the table is mounted at the center of the rotary table. A flexible piece of line arranged in a box inside the table permits the rotary table to perform a limited rotary movement of, for example, 180°. One end of this piece of line is connected to the central coupling, while its other end projects downwardly from the rotary table, for example through a stationary central pipe.

However, it has been found in practice that the known machine tool does not in all cases meet the demands of all applications. In particular, the line piece permitting limited rotary movement takes up considerable space in the work table; in addition, it is rather complicated to realize the necessary connections so that the latter may become the source of trouble when being subjected to extreme stress. Moreover, the known arrangement becomes the more complicated and costly the more lines have to be run to the work table.

Another method to run lines on machine tools has been known from German Patent Publication No. 11 07 310. The known machine is a longitudinal-bed milling machine provided with a portal-like frame that can be displaced in the axial direction above a stationary longitudinal bed. The portal carries two milling heads that can be displaced vertically, and perpendicularly to the axial direction. In addition, the portal is provided with a scanner which, during axial movement, scans control marks provided below the work table. The before-mentioned printed publication does, however, not mention any connection lines between the axially displaceable portal and a stationary point of the machine tool. On the other hand, the lines run inside the portal for supplying the milling heads are shown and described in detail. According to this description, all lines are tensioned at any time by suitable tension rollers so that any sagging of the lines in the box-shaped upper portion of the portal is avoided. A plurality of lines are run from a lateral point of the portal, which can be displaced vertically together with the milling heads, to the scanner which cannot be displaced vertically. To overcome the small vertical relative movement between the transmission board and the scanner, several lines hang down between the transmission board and the portal and the body of the scanner in the form of a loop.

The system does not provide for an axial movement of the transmission board relative to the scanner in a horizontal plane. Moreover, the described connection lines are provided in a part of the machine tool, i.e. below the work table, where no risk of collision exists between the lines and the area of movement of the milling heads or the working area of an operator, during movement of the milling heads along their three Cartesian axes above the work table or during chucking or unchucking of workpieces on the work table by the user.

Now, it is the object of the present invention to improve a machine tool of the type described above in such a manner that a line connection which permits rotary movements of the table and which also allows a plurality of electric lines or fluid lines to be provided but which, on the other hand, does not impair the operation of the machine tool, can be realized in a simple manner.

According to the invention, this object is achieved by an arrangement in which the line, hanging down loosely between the two parts, is connected above the work table to a point on the stationary part of the machine tool and, on the other hand, to a connection box of the work table, the said point and the connection box being arranged at a certain distance relative to the axis and being offset at a right angle relative to each other.

This solves the object underlying the invention fully and perfectly because the lines which hang down loosely can be connected on both ends by means of commercially available connectors which are, moreover, easily accessible. The fact that the upper connection points of the lines are located at or near the rotary axis of the work table leads to a symmetrical movement, which causes only minimum mechanical deformation of the lines, when the work table is alternately rotated in the two directions by 180°.

A preferred embodiment of the invention distinguishes itself by the fact that the connection box is arranged on the parting line between the machining side and the mounting side of the table and is guided along a path of movement exhibiting approximately the shape of a semicircle opening towards the spindle stock during rotation of the table.

Apart from the fact that this arrangement leads to even greater symmetry in the movements, it provides the additional advantage that due to the exactly lateral arrangement of the connection box the latter will not get into conflict neither with the spindle stock on the processing side, nor with the user changing the workpiece on the mounting side.

Another embodiment of the invention is distinguished by the feature that the line ends at the stationary point and at the connection box in connectors whose axes are aligned parallel to each other.

This feature provides the advantage that the lines are directly aligned already in the area of the connectors which helps minimize the deformations of the during movement of the table.

A particularly favorable effect is achieved when the stationary point is located on a portal spanning the housing.

This feature provides the advantage that the machine tool can make use of a conventional, laterally closed housing which, thus, ensures that coolant and chips are prevented from splashing or flying around the machine tool. Housings of this type are, normally, open on top to enable workpieces to be mounted on the work table from above, by means of a crane, if this should become necessary occasionally due to the particularly high weight or large dimensions of the workpiece. The portal spanning the housing provides in this case the advantage that the stationary point for connecting the lines can be fixed in a suitable position above the table near the extension of the rotary axis of the table. In addition, it provides the advantage that existing machine tools can be retrofitted with the described lines, simply by screwing the portal to the housing of the existing machine, as a supplement.

According to a particularly preferred variant of this embodiment of the invention, the portal is provided with hollow frame pieces for accommodating the lines. This feature provides the advantage that the connection lines for signals and/or energy are protected inside the portal frame.

Another variant of the same embodiment of the invention is characterized by the features that the line hanging loosely from the portal is fastened by means of a connector, that the connector is fastened detachably on the portal and that another line leads from the connector to a plug element forming part of a plug-and-socket connection arranged on the portal.

This feature provides the advantage that the line hanging down loosely can be mounted and detached very easily because the connection between this line portion and the fixed line in the portal and, on the housing of the machine tool, the central control box can be disconnected easily by means of the detachable plug element.

Finally, another embodiment of this variant is preferred where the portal is arranged above the mounting side.

This feature provides the advantage that both the portal and the lines hanging down loosely are always arranged at a distance from the spindle stock of the machine tool so that there is no risk of collision, even if the spindle stock projects a little over the axis of the machine tool towards the mounting side, due to its particular overhung design.

Other advantages of the invention will become apparent from the following specification and the attached drawing.

It is understood that the features that have been explained above and will be described hereafter can be used not only in the stated combinations, but also in other combinations or individually, without leaving the scope of the present invention.

One embodiment of the invention will be described hereafter in detail with reference to the drawing in which.

Figure 1:
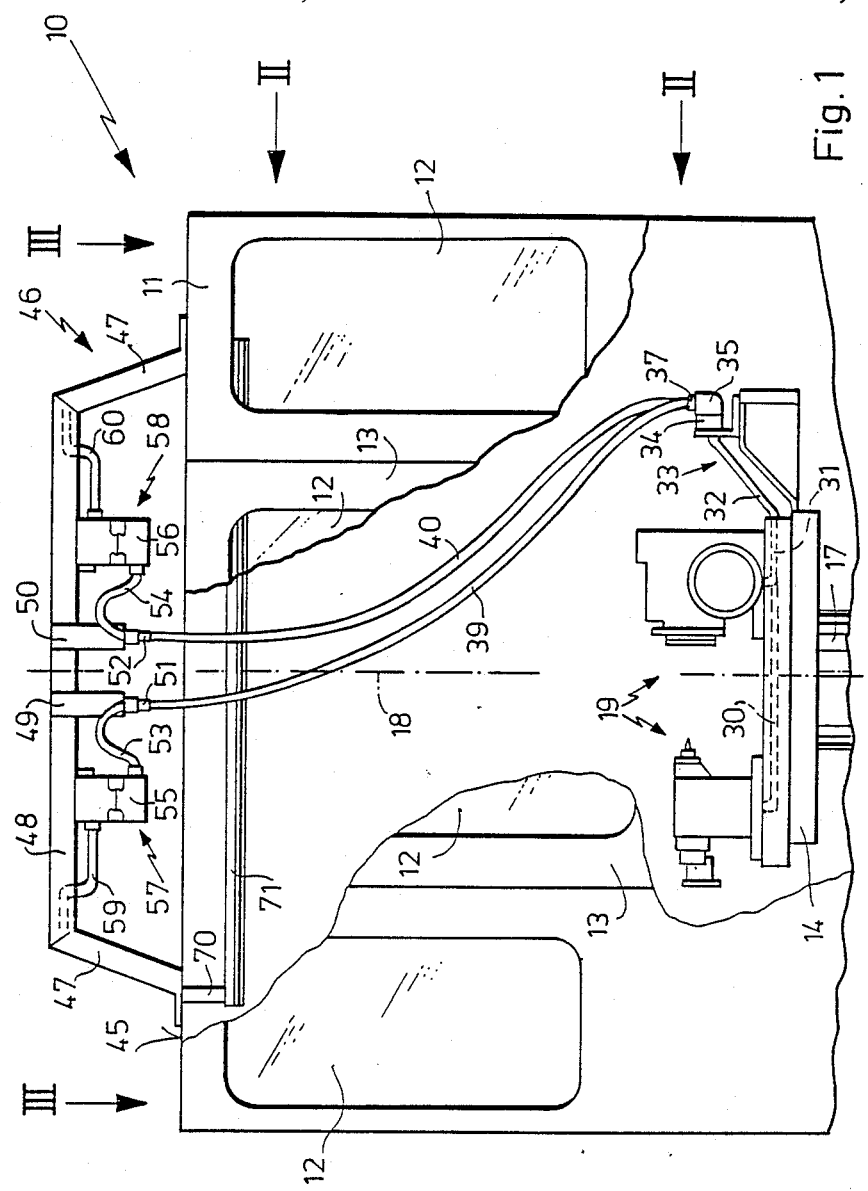
FIG. 1 shows a front view of one embodiment of a machine tool according to the invention.

In the figures, a machine tool, for example a numerically controlled drilling and milling center, is designated generally by reference numeral 10. The machine tool 10 is enclosed by an all-round closed housing 11 provided with windows 12. At the front of the housing 11, sliding doors 13 that can be closed during the machining operation are provided at the point where the user of the machine tool 10 is positioned. A horizontal work table 14 located inside the housing 11 comprises two sides, namely one facing the user and described as mounting side 15 and one facing the spindle stock 20 and described as processing side 16. The mounting side 15 is separated from the processing side 16 by an imaginary parting line 23.

The work table 14 is mounted on a vertical shaft 17 that can be rotated about a vertical axis 18. The mounting side 15 and the processing side 16 of the work table 14 carry each a dividing attachment 19, 19a arranged for chucking a workpiece not shown in the figure.

The spindle stock 20 is equipped with a tool 21, for example a drilling or milling tool, and can be displaced along several axes, as indicated by the system of coordinates 22.

During operation of the machine tool 10, a workpiece is arranged in the dividing attachment 19a on the processing side 16 of the work table 14 for being processed by the tool 21 in accordance with the numerical control of the machine tool 10. While this machining operation is being carried out, the user of the machine tool 10 can remove the previously processed workpiece from the dividing attachment 19 arranged on the mounting side 15 of the work table 14 and mount another workpiece to be machined next.

Upon completion of the machining operation by the tool 21, the work table 14 is rotated by 180°, and the described cycle can start again.

In order to enable, on the one hand, the dividing attachments 19, 19a to be supplied with energy and, on the other hand, signals to be supplied to or from the dividing attachments 19, 19a, the work table 14 is provided with channels 30, 31, as indicated in FIG. 1, accommodating a first line 32 and a second line 33. In the context of the following description, the term "line" shall be interpreted to describe any type of connection line by which electric current, electric or fluid signals, compressed air, hydraulic fluid or the like can be transported.

The lines 32, 33 are guided to a connection box 34 where they end approximately in horizontal position. The connection box 34 comprises two elbows 35, 36 equipped with two upwardly extending connectors 37, 38. These connectors serve to connect a third line 39 and a fourth line 40 leading along a long curved path to the upside 45 of the housing 11.

The upside 45 of the housing 11 is spanned by a portal 46 comprising two inclined frame pieces 47 and a horizontal frame piece 48 interconnecting the inclined frame pieces. Mounted at the center of the horizontal frame piece 48 are two downwardly extending, detachable brackets 49, 50. The brackets 49, 50 in turn are provided on their lower ends with two downwardly projecting connectors 51, 52 receiving the ends of the lines 39, 40.

A fifth line 53 and a sixth line 54 lead from the connectors 51, 52 to plug elements 55, 56, respectively, forming part of detachable plug-and-socket connections 57 and 58, respectively. A seventh line 59 and an eighth line 60 lead from these latter connections 57, 58 into the hollow frame pieces 47, 48 from where they emerge, in the manner indicated in FIG. 2, by a ninth line 61, for further connection to a control box of the machine tool 10.

Figure 3:
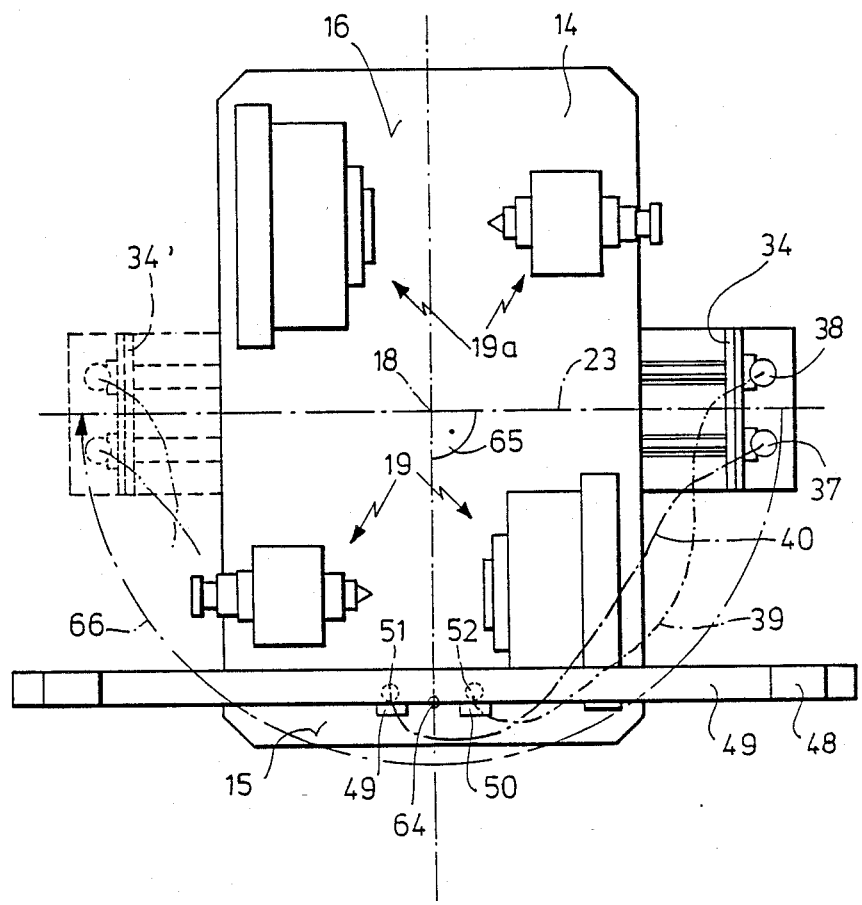
FIG. 3 shows a (simplified) top view of the machine tool illustrated in FIG. 1, viewed in the direction of arrows III—III in FIG. 1.

In the top view of FIG. 3 it can be seen that the brackets 49, 50 forming the connections of the lines 39, 40 are arranged symmetrically relative to the point of symmetry 64, the latter being in turn arranged at a right angle 65 relative to the parting line 23 and/or the connection box 34 arranged thereon.

FIG. 3 shows, at 34, the connection box in a first position and a semicircle 66 opening towards the spindle stock, along which the connection box is guided when it is rotated together with the work table 14 into the position 34' indicated by dashed lines in FIG. 3.

Finally, a pipe 72 may be suspended on traverses 70, 71 below the horizontal frame piece 48 and in parallel arrangement to the latter, as can be seen best in FIGS. 1 and 2, for keeping the lines 39, 40 safely clear of the working space of the spindle stock during rotary movement of the work table 14.

Figure 2:
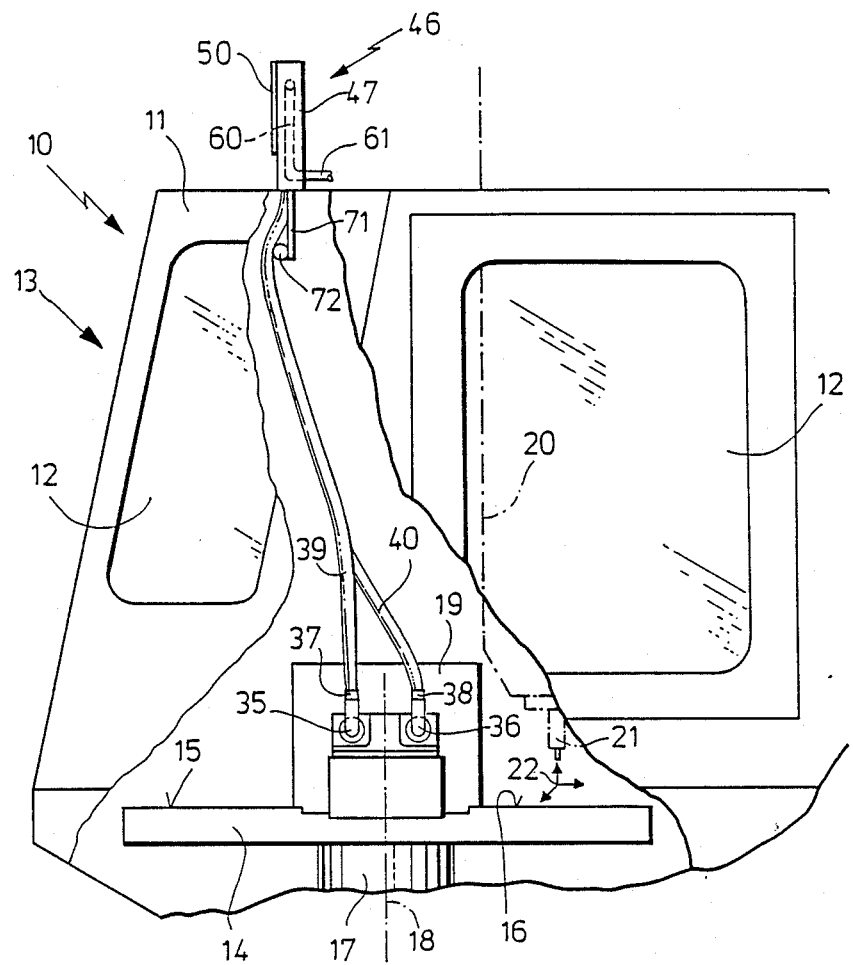
FIG. 2 shows a side view of the embodiment illustrated in FIG. 1, viewed in the direction of arrows II—II in FIG. 1.

Further, it can be clearly seen in FIG. 2 that the portal 46 is offset towards the front, relative to the axis 18, and arranged in an area above the mounting side 15. This is another measure designed to ensure that the spindle stock 20 can be displaced to the front as far as possible, without colliding with the system of lines.

We claim:
1. A machine tool comprising:
   a worktable defining a front side, a rear side, a left-hand side and a right-hand side, said table having an upper surface subdivided into a mounting area and a processing area, said mounting area being located substantially at said front side of said worktable and said processing area being located substantially at said rear side of said worktable;
   a spindle stock arranged adjacent said rear side of said worktable;
   means for alternately rotating said worktable in opposite rotational directions about an axis perpendicular to said worktable surface, wherein in a first table position a first portion of said worktable surface is located adjacent said spindle stock and serving as said processing area within which said machine tool is working on a first workpiece arranged on said processing area at said rear side, and a second portion of said worktable surface is located at a distance from said spindle stock and serving as said mounting area for removing a second, worked workpiece from and mounting a third, unworked workpiece on said mounting area at said front side while said first workpiece is being worked, and wherein in a second table position said first portion is located at a distance from said spindle stock and serving, in said second position, as said mounting area whereas said second portion is located adjacent said spindle stock and serving, in said second position, as said processing area; and
   a first line extending from a stationary first point of said machine tool to a movable second point on said rotatable worktable for transmitting energy to said table, said stationary first point being arranged above said worktable surface at said front side and said first line extending freely from said first point, said movable second point being located at said right-hand side of said worktable in said first position and at said left-hand side of said worktable in said second position, said first and second points being arranged at a radial distance from said axis.

2. The machine tool of claim 1, wherein a second line is connected in parallel relation to said first line, between said first and second points.

3. The machine tool of claim 1, wherein said movable second point is located on a symmetry line of said table surface separating said processing area from said mounting area of said table, said second point being guided along a path of movement of approximately semi-circular shape opening towards said spindle stock during rotation of said table.

4. The machine tool of claim 1, wherein said first line terminates at said first and second points in connectors, said connectors having axes aligned in parallel to each other.

5. The machine tool of claim 1, wherein said stationary first point is located on a portal spanning said front side.

6. The machine tool of claim 5, wherein said portal is provided with hollow frame pieces for accommodating said first line.

7. The machine tool of claim 5, wherein said first line extending freely from said portal is fastened to said portal by means of a clamp, said clamp being detachably connected to said portal, said first line being guided from said clamp over to a plug element forming part of a plug-and-socket connector arranged on said portal.

8. The machine tool of claim 1, wherein electrical energy is transmitted via said first line.

9. The machine tool of claim 1, wherein hydraulic energy is transmitted via said first line.

10. The machine tool of claim 1, wherein pneumatic energy is transmitted via said first line.

11. The machine tool of claim 1, wherein signal energy is transmitted via said first line.

* * * * *